United States Patent
McCord et al.

(10) Patent No.: US 10,405,524 B2
(45) Date of Patent: Sep. 10, 2019

(54) SQUIRREL-PROOF BIRD FEEDER

(71) Applicant: Apollo Investment Holding Co. LLC, Juneau, WI (US)

(72) Inventors: Keith W. McCord, Florissant, MO (US); Kenneth R. Hepp, Oconomowoc, WI (US); Thomas J. Green, West Bend, WI (US)

(73) Assignee: APOLLO INVESTMENT HOLDING CO. LLC, Juneau, WI (US)

( * ) Notice: Subject to any disclaimer, the term of this patent is extended or adjusted under 35 U.S.C. 154(b) by 498 days.

(21) Appl. No.: 14/921,837

(22) Filed: Oct. 23, 2015

(65) Prior Publication Data

US 2016/0113247 A1 Apr. 28, 2016

Related U.S. Application Data

(60) Provisional application No. 62/067,724, filed on Oct. 23, 2014.

(51) Int. Cl.
*A01K 39/01* (2006.01)
*A01K 5/01* (2006.01)

(52) U.S. Cl.
CPC ........ *A01K 39/0113* (2013.01); *A01K 5/0142* (2013.01)

(58) Field of Classification Search
USPC .... 119/52.1–52.4, 57.8, 57.9; D30/121, 124, D30/127, 128
See application file for complete search history.

(56) References Cited

U.S. PATENT DOCUMENTS

| | | | |
|---|---|---|---|
| 3,145,690 A * | 8/1964 | Bachman | A01K 39/0113 119/52.3 |
| 4,104,987 A * | 8/1978 | Winston | A01K 39/012 119/57.8 |
| 4,246,869 A * | 1/1981 | Tobin, Jr. | A01K 39/012 119/57.8 |
| 4,541,362 A * | 9/1985 | Dehls | A01K 39/0113 119/57.9 |
| 4,646,686 A | 3/1987 | Furlani | |
| 5,720,238 A * | 2/1998 | Drakos | A01K 39/0113 119/57.9 |
| 5,964,183 A * | 10/1999 | Czipri | A01K 39/012 119/52.3 |
| 6,253,707 B1 * | 7/2001 | Cote | A01K 39/0106 119/57.9 |
| 6,591,781 B2 | 7/2003 | Hardison | |
| 6,918,353 B1 * | 7/2005 | Coroneos | A01K 39/0113 119/52.3 |
| 7,370,607 B2 | 5/2008 | O'Dell | |
| 7,726,259 B2 * | 6/2010 | Hepp | A01K 39/014 119/57.9 |

(Continued)

Primary Examiner — Andrea M Valenti
(74) Attorney, Agent, or Firm — Michael Best & Friedrich LLP

(57) ABSTRACT

An animal feeder includes a feed bin that is at least partially defined by a base, an interior panel extending upward from the base, and an exterior panel extending upward from the base. An intermediate structure is located between the interior panel and the exterior panel. The feed bin contains an opening that is covered by the intermediate structure when a predetermined weight is placed on the intermediate structure.

16 Claims, 5 Drawing Sheets

(56) References Cited

U.S. PATENT DOCUMENTS

| | | | |
|---|---|---|---|
| 8,794,184 B2* | 8/2014 | Cote | A01K 39/0113 |
| | | | 119/52.3 |
| 9,828,726 B2* | 11/2017 | Hiljanen | D21C 11/0007 |
| 2012/0037080 A1* | 2/2012 | Hepp | A01K 39/0113 |
| | | | 119/52.3 |

* cited by examiner

SQUIRREL-PROOF BIRD FEEDER

This application claims priority to U.S. Provisional Patent Application No. 62/067,724, filed Oct. 23, 2014, the entire contents of which are hereby incorporated by reference.

BACKGROUND OF THE INVENTION

The use of bird feeders is well known to provide feed for small birds. However, other animals such as squirrels and larger "predator" birds also consume the feed which can scare away the smaller birds. Therefore, squirrel-proof bird feeders are utilized to prevent the squirrels and other predators from eating the feed.

Squirrel-proof bird feeders often rely on weight activated systems to prevent heavier creatures (e.g., squirrels, large birds) from eating the feed, yet allowing light birds to access the feed. Many of these feeders require multiple layers of materials (i.e. a feed bin layer, a closing feature layer, and an exterior safety layer) to timely and adequately prevent feeding larger animals.

SUMMARY OF THE INVENTION

The invention provides, in one aspect, an animal feeder. The animal feeder includes a feed bin that is at least partially defined by a base, an interior panel extending upward from the base, and an exterior panel extending upward from the base. An intermediate structure is located between the interior panel and the exterior panel. The feed bin contains an opening that is covered by the intermediate structure when a predetermined weight is placed on the intermediate structure.

The invention provides, in another aspect, an animal feeder. The animal feeder includes a feed bin at least partially defined by a base and a plurality of sides extending upward from the base. An exterior structure includes a plurality of perches and a plurality of doors movable relative to the feed bin. The plurality of doors are not attached to one another at any point below any of the plurality of doors. The feed bin contains a plurality of holes covered by the plurality of doors when a predetermined weight is placed on the exterior structure.

BRIEF DESCRIPTION OF THE DRAWINGS

FIG. 5b is an exploded view of the bird feeder shown in FIG. 5a.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
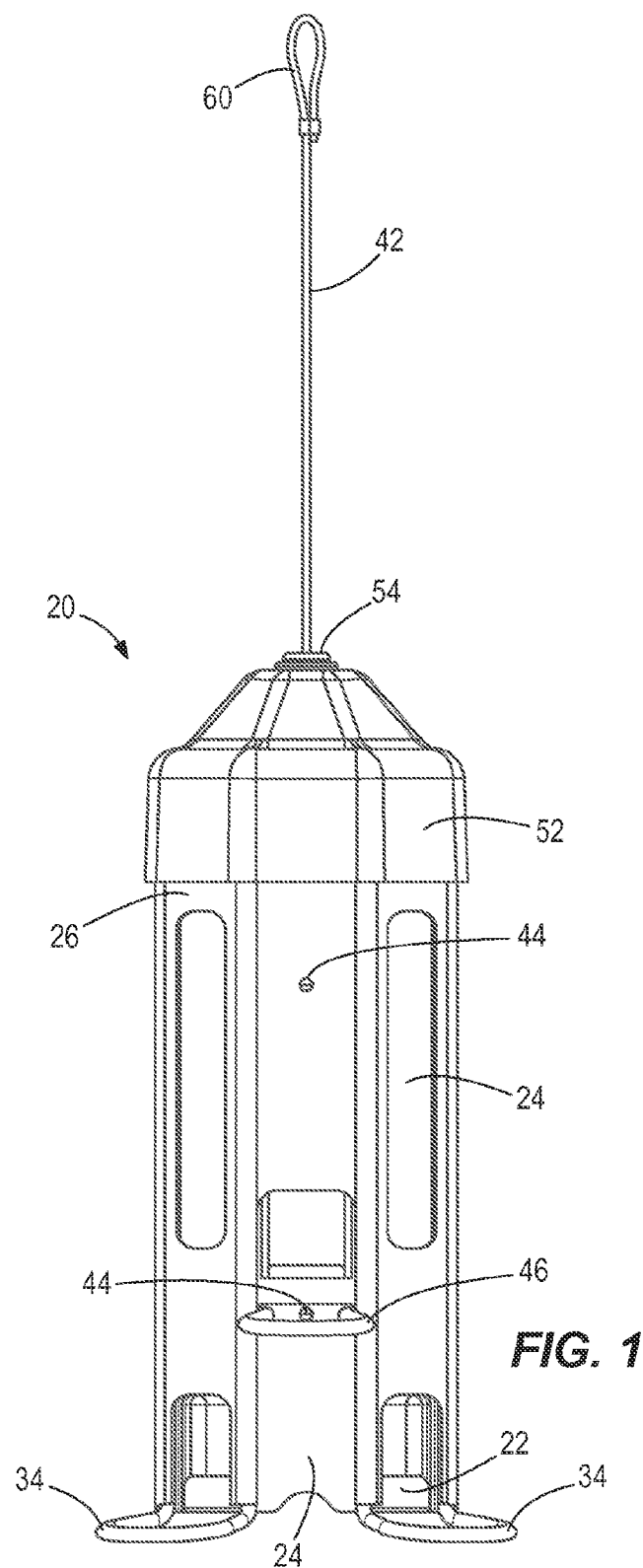
FIG. 1 is a front view of the bird feeder.

FIG. 1 illustrates a bird feeder 20 of the present invention. An interior panel 24, comprising two identical interior panel segments, is located within an exterior panel 26, comprising two identical exterior panel segments. A base 22 is provided near the lower end of the interior panel 24 and the exterior panel 26, as shown in FIG. 1. Both the interior panel 24 and the exterior panel, along with the base 22, delimit a feed bin. The feed bin is defined as the portion of the bird feeder 20 which holds the feed (i.e., the portion of the bird feeder 20 in contact with the store of seeds in the feeder 20). The interior panel 24, the exterior panel 26, and the base 22 are attached to one another with a plurality of rivets 44. Alternatively, alternative joining or fastening options (e.g., screws, bolts, adhesive, etc.) can be utilized.

An intermediate structure 28 (FIG. 2) is provided between the interior panel 24 and the exterior panel 26. The intermediate structure includes two identical intermediate structure segments, including, each including at least one perch 34. An additional perch, not integrally formed with the intermediate structure can be fastened to the intermediate structure with a rivet 44 or an alternative joining or fastening option. The particulars of the intermediate structure will be further explained with reference to FIG. 2.

A roof 52 is provided over the top end of the interior panel 24 and the exterior panel 26, as shown in FIG. 1. The top end is the end opposite the end supporting the base 22. The roof 52 is held adjacent to the feed bin (e.g., above the feed bin when the bird feeder 20 is hanging) by a holding mechanism 54, through which a support member 42 (e.g., cable, string, rope, wire) extends. The holding mechanism 54 can mate with the roof 52 (e.g. via a twisting or pressing motion) and, as shown, may be embodied as a grommet (e.g., plastic grommet, rubber grommet, etc.). Additionally or alternatively, the roof 52 can include a magnetic hold down mechanism. The magnetic hold down mechanism provides a magnetic coupling or magnetic lock force between the feed bin and the roof 52. The magnetic lock force is great enough that a squirrel is not capable of removing the roof 52, but a person intent on refilling the feed bin would be able to remove the roof 52. A secondary magnet can be attached to the top of the support member 42, or at least away from the feed bin. The secondary magnet can mate with the magnetic hold down mechanism and serve as a temporary holding position for the roof 52 to provide access to the feed bin, for example, when the person is refilling the feed bin. The magnetic hold down mechanism and the secondary magnet can be used with the roof 52, 152, 252 of any of the bird feeder 20 embodiments. The bird feeder 20 can be hung on a tree or a post by a loop 60 or hook built into the top of the support member 42. A stopper 62 (FIG. 3) is placed around the bottom of the support member 42.

Figure 2:
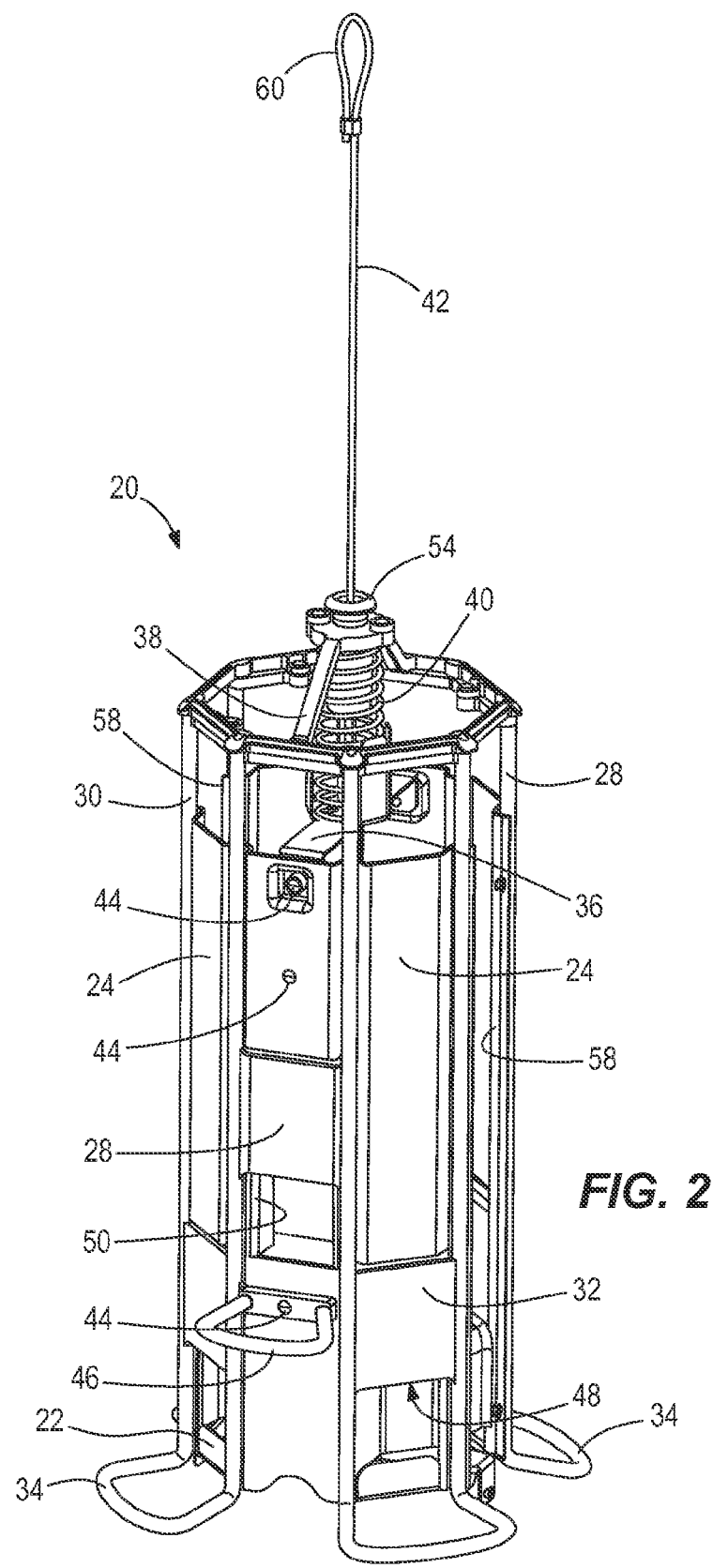
FIG. 2 is a perspective view of the partially deconstructed bird feeder.
Figure 3:
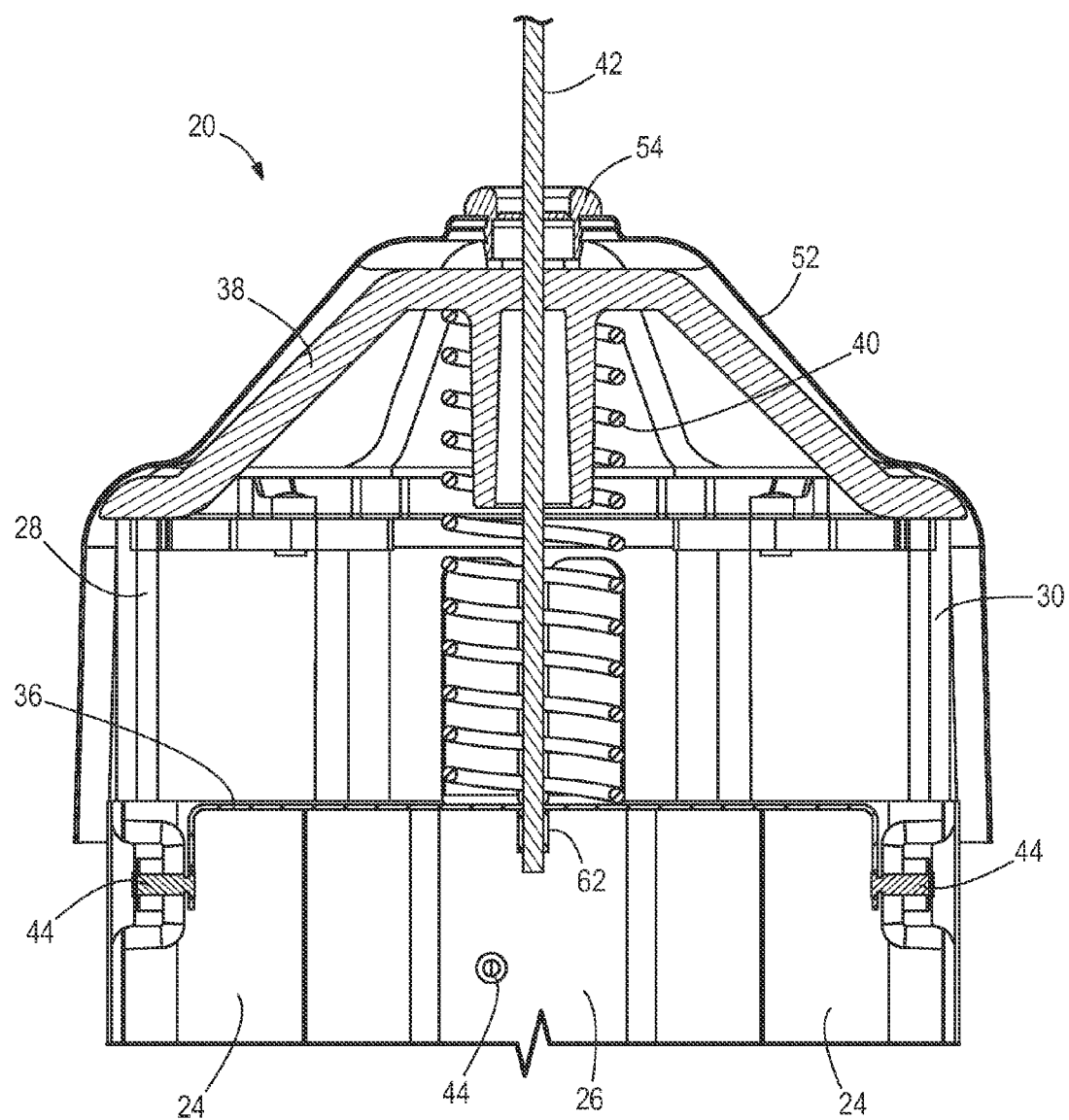
FIG. 3 is a cross-sectional view of a portion of the bird feeder.

FIGS. 2 and 3 show the internal features of the bird feeder 20. FIG. 2 illustrates the bird feeder 20 without the roof 52 or the exterior panel 26 for clarity of some internal features. FIG. 3 shows a close-up cross-section of some of the internal features. When in a fully assembled state, a channel 58, defined by the area between the two identical interior panel segments, is covered by the exterior panel 26, thereby partially delimiting the feed bin. The interior panel 24 contains an orifice 50, and can include a plurality of orifices 50, through which small birds are able to reach the feed within the feed bin. Within the feed bin, the orifice 50 is shielded from above by a feed hold-back hood or interior feed hood 48. The interior feed hood 48 prevents the seed that is located within the feed bin and above the orifice 50, from falling through the orifice 50.

The intermediate structure 28 is composed of a plurality of vertical rods 30 connected by the perch 34 and a blocking member 32. The vertical rods 30 can also be connected by the additional perch 46 (i.e., the perch which is not integral with the intermediate structure 28). The blocking member 32 closes over the orifice 50 when a predetermined weight is placed on any part of the intermediate structure 28.

The intermediate structure segments are connected to one another via a bridge member 38 located at the top end of the bird feeder 20 and under the roof 52. The bridge member 38 includes a ring located about the periphery of the bird feeder 20 and a bridge component extending radially across the ring. At the center of the bridge component, a cylindrical portion extends downward.

A cross member 36 extends radially across the bird feeder 20 from one interior panel segment to the other interior panel segment near the top end, yet below the bridge member 38. The cross member 36 is riveted to each of the interior panel segments. At the center of the cross member 36 is a circular portion with a plurality of peripheral protuberances extending upwards and axially centered with the cylindrical portion of the bridge member 38. The circular portion contains an opening through which the support member 42 extends. The opening is large enough to allow the support member through, but does not let the stopper 62 pass through, thereby providing suspension for the bird feeder 20. A compression spring 40 is located within the peripheral protuberances and extends upwards around the cylindrical portion of the bridge member 38. Therefore, as the bridge member 38 provides suspension to the interior panel 24, compression and extension of the compression spring 40 allows the intermediate structure 28 to move relative to the interior panel 24. As the interior panel 24 is riveted to the exterior panel 26, the intermediate structure 28 is able to move relative to the exterior panel 26 as well.

When a small bird is perched on the intermediate structure 28, specifically the perch 34, or the additional perch 46, the weight of the small bird is not great enough to cause the compression spring 40 to move the blocking member 32 over the orifice 50. However, if a squirrel or a larger bird rests upon the intermediate structure 28, a threshold value or predetermined weight is met and the compression spring 40 compresses to the point where the blocking member 32 covers the orifice 50. When the predetermined weight is removed, the compression spring 40 extends and the blocking member 32 retracts away from the orifice 50.

Figure 4:
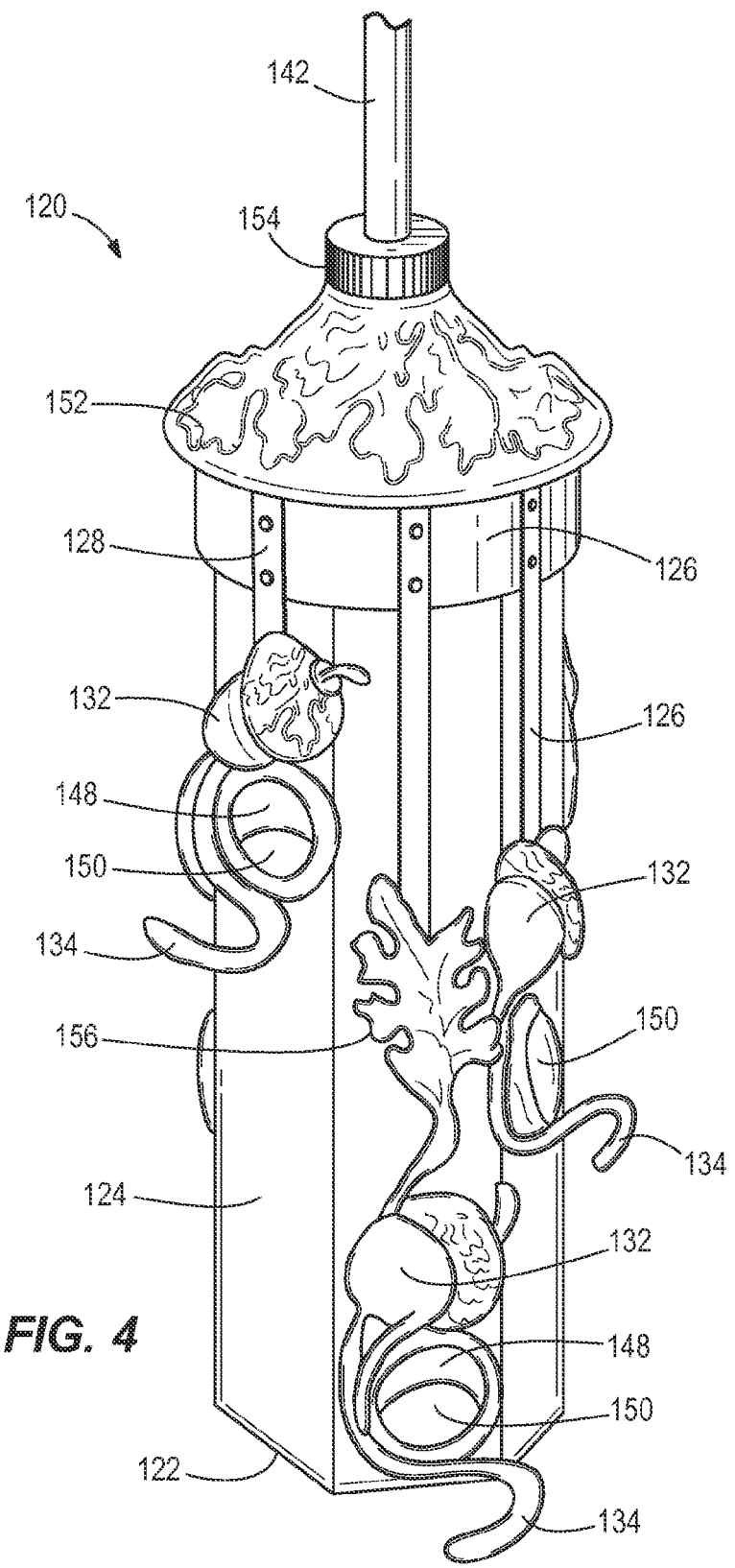
FIG. 4 is a perspective view of an additional embodiment of the present invention.

In an alternative embodiment, FIG. 4 shows a bird feeder 120. The bird feeder 120 includes a feed bin which includes a base 122 and a plurality of sides 124. Alternatively, the plurality of sides 124 could be a one-sided cylinder. The feed bin is preferably made from a transparent or translucent material and contains a plurality of openings 150. Each of the openings 150 is provided with an interior feed hood 148. The feed bin is capped with a roof 152 which is held in place by a holding feature 154. Similar to the previous bird feeder 20, the bird feeder 120 is supported by a support member 142.

An exterior structure 126 is located about the plurality of sides 124. The exterior structure includes a plurality of strips 128 extending downward from a ring portion located beneath the roof 152. Each of the strips 128 contains a perch 134 for a small bird and a door 132 capable of blocking one of the openings 150. In this embodiment, each of the doors 132 is vertically staggered when compared to the adjacent doors 132. That is to say, the length of the each of the plurality of strips 128 differs from each of the plurality of strips 128 directly adjacent. The exterior structure 126 can further contain decorative components 156 such as foliage, animals, or insects. Additionally, the doors 132 can be embodied as a decorative component 156, such as an acorn.

The bird feeder 120 generally functions in a similar manner to the bird feeder 20. When a small bird is perched on the exterior structure 126, specifically one of the perches 134, the weight of the small bird is not great enough to cause a compression spring (not shown) to move the doors 132 over the openings 150. However, if a squirrel or a larger bird rests upon the exterior structure 126, a threshold value or predetermined weight is met and the compression spring (not shown) compresses to the point where the doors 132 cover the openings 150. When the predetermined weight is removed, the compression spring (not shown) extends and the doors 132 retract away from the openings 150.

Figure 5A:
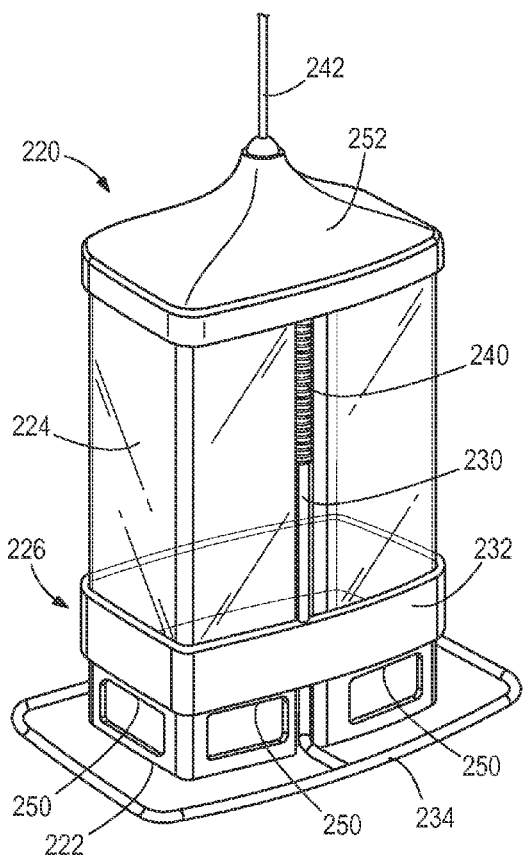
FIG. 5a is a perspective view of another additional embodiment of the present invention.
Figure 5B:
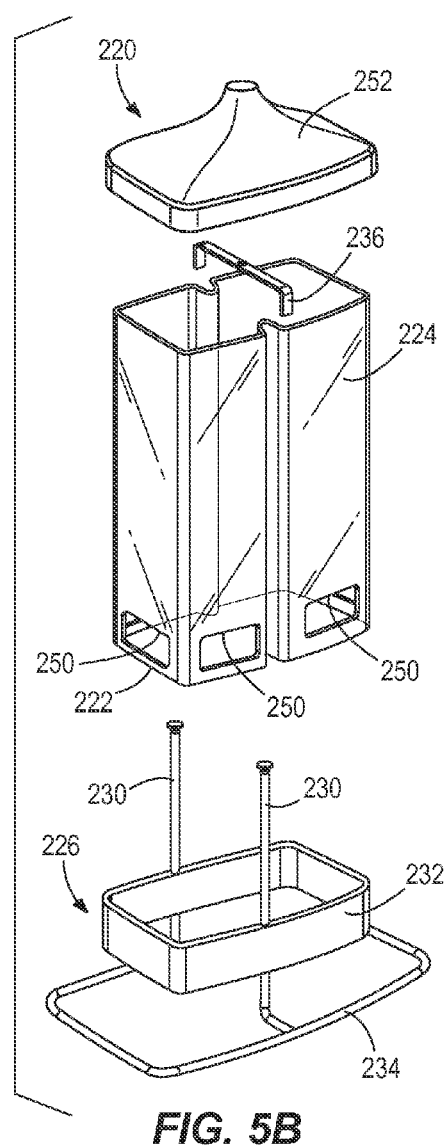

In yet another alternative embodiment, FIGS. 5*a* and 5*b* show a bird feeder 220. A feed bin includes a base 222 and a plurality of sides 224, integrally formed as one component. The plurality of sides 224 can alternatively be embodied as one cylindrical side. The plurality of sides 224 are made of a transparent or translucent material and contain a plurality of openings 250 which are selectively covered by a door 232 when a predetermined weight is placed on an exterior structure 226. The feed bin is capped by a roof 252, through which extends a support member 242 for hanging the bird feeder 220.

The exterior structure 226 includes a plurality of vertical support rods 230 connected to one another by a peripheral perch 234 and the door 232. When in an assembled state (FIG. 5*a*), the door 232 rests adjacent the exterior of the feed bin. Therefore, the door 232 is capable of covering the openings 250 when a predetermined weight is placed upon the exterior structure. As shown, the peripheral perch 234 wraps entirely around the plurality of sides 224 of the feed bin. Alternatively, the exterior structure 226 can include additional vertical support rods 230 and locate multiple peripheral perches 234 near every opening 250. Each vertical support rod 230 is connected to a compression spring 240 which allows the exterior structure 226 to move relative to the feed bin.

The compression springs 240 attach to the top of the vertical support rods 230, as shown in FIG. 5*a*, and attach to a multi-spring cross member 236, as shown in FIG. 5*b*. The multi-spring cross member 236 extends across the feed bin and provides attaching points for the compression springs 240. The multi-spring cross member 236 also contains a centrally located orifice through which the support member 242 is configured to extend. A stopping feature (not shown) located near one end of the support member 242 is larger than the centrally located orifice and therefore allows the support member 242 to suspend the bird feeder 220.

The bird feeder 220 generally functions in a similar manner to the bird feeder 20 and the bird feeder 120. When a small bird is perched on the exterior structure 226, specifically the perch 234, the weight of the small bird is not great enough to cause the compression springs 240 to move the door 232 over the openings 250. However, if a squirrel or a larger bird rests upon the exterior structure 226 (including the perch 234), a threshold value or predetermined weight is met and the compression springs 240 compress to the point where the door 232 covers the openings 250. When the predetermined weight is removed, the compression springs 240 extend and the door 232 retracts away from the openings 250.

Although the invention has been described in detail with reference to certain preferred embodiments, variations and modifications exist within the scope and spirit of one or more independent aspects of the invention as described.

What is claimed is:

1. An animal feeder comprising:
   a feed bin at least partially defined by a base;
   an interior panel extending upward from the base, the interior panel having an access port;
   an exterior panel extending upward from the base, the exterior panel having an access port;
   an intermediate structure located between and movable relative to the interior panel and the exterior panel;
   a cross member extending the width of the feed bin, connected to the interior panel;
   a bridge member extending the width of the feed bin, connected to the intermediate structure; and
   a compression spring located between the cross member and the bridge member, wherein the interior panel, intermediate structure, and exterior panel are in a layered configuration, aligning the access port of the interior panel and the access port of the exterior panel;
   wherein the access port of the interior panel is closed by the intermediate structure when a predetermined weight is placed on the intermediate structure.

2. The animal feeder of claim 1, wherein the intermediate structure is comprised of a plurality of vertical rods connected by a blocking member and a perch.

3. The animal feeder of claim 2, wherein the access port of the interior panel is covered by the blocking member when the predetermined weight is placed on the intermediate structure.

4. The animal feeder of claim 1, wherein the intermediate structure is comprised of two identical intermediate structure segments.

5. The animal feeder of claim 4, wherein the intermediate structure segments are connected to one another via the bridge member.

6. The animal feeder of claim 1, wherein the compression spring does not extend past the access port of the interior panel.

7. The animal feeder of claim 1, further comprising a support member for hanging the animal feeder, wherein the support member is coupled to the cross member.

8. The animal feeder of claim 1, wherein the cross member is attached to the interior panel with at least one rivet.

9. The animal feeder of claim 1, further comprising at least one additional perch not integrally formed with the intermediate structure.

10. The animal feeder of claim 1, wherein the exterior panel is comprised of two identical exterior panel segments.

11. The animal feeder of claim 1, wherein the interior panel is comprised of two identical interior panel segments.

12. The animal feeder of claim 1, further comprising at least one additional access port of the interior panel that is covered by the intermediate structure when the predetermined weight is placed on the intermediate structure.

13. The animal feeder of claim 12, wherein the intermediate structure includes a blocking member, wherein the access port of the interior panel is covered by the blocking member when the predetermined weight is placed on the intermediate structure, and wherein the at least one additional access port is covered by at least one additional blocking member when the predetermined weight is placed on the intermediate structure.

14. The animal feeder of claim 1, wherein the interior panel and/or the exterior panel is made from a transparent or translucent material.

15. The animal feeder of claim 1, further comprising a feed hood located within the interior panel and above the opening.

16. An animal feeder comprising:
    a feed bin at least partially defined by a base;
    an interior panel extending upward from the base, the interior panel having an access port;
    an exterior panel extending upward from the base, the exterior panel having an access port; and
    an intermediate structure located between and movable relative to the interior panel and the exterior panel;
    wherein the interior panel, intermediate structure, and exterior panel are in a layered configuration, aligning the access port of the interior panel and the access port of the exterior panel;
    wherein the access port of the interior panel is closed by a blocking member of the intermediate structure-when a predetermined weight is placed on the intermediate structure, and
    wherein the intermediate structure comprises a plurality of compressively rigid vertical rods connected by the blocking member and a perch.

* * * * *